United States Patent [19]

Mader

[11] Patent Number: 4,585,265
[45] Date of Patent: Apr. 29, 1986

[54] THREE POSITION TAILGATE

[76] Inventor: Curt H. Mader, 13625 Spring St., Grandview, Mo. 64030

[21] Appl. No.: 644,223

[22] Filed: Aug. 27, 1984

[51] Int. Cl.⁴ .............................................. B62D 35/00
[52] U.S. Cl. ..................................... 296/1 S; 296/56; 296/57 R
[58] Field of Search ...................... 296/51, 50, 53, 56, 296/57 R, 1 S; 49/193, 197

[56] References Cited

U.S. PATENT DOCUMENTS

| | | | |
|---|---|---|---|
| 1,037,341 | 9/1912 | Shaw | 296/60 |
| 2,742,317 | 4/1956 | Chandler | 296/51 |
| 3,656,800 | 4/1972 | Timmons | 296/50 |
| 3,734,560 | 5/1973 | Cramblet | 296/57 |
| 4,136,905 | 1/1979 | Morgan | 296/57 |
| 4,358,150 | 11/1982 | Nash | 296/57 |
| 4,475,759 | 10/1984 | Wine | 296/50 |

Primary Examiner—Robert R. Song
Attorney, Agent, or Firm—Kokjer, Kircher, Bradley, Wharton, Bowman & Johnson

[57] ABSTRACT

A tailgate which can be moved to any of three positions on the back end of a vehicle. In addition to the normal open and closed positions, the tailgate has an elevated stabilizing position in which it is elevated above the vehicle bed in a horizontal orientation to reduce air drag and increase fuel economy. Each end of the tailgate has spring loaded upper and lower pins which can be retracted by operating handles on the tailgate. The lower pins are received in hinge openings in the vehicle sides to provide a hinge axis about which the tailgate can be opened and closed. Slots in the vehicle sides receive the upper pins to latch the tailgate closed. Both sets of pins fit in the slots when the tailgate is moved to the elevated position.

13 Claims, 5 Drawing Figures

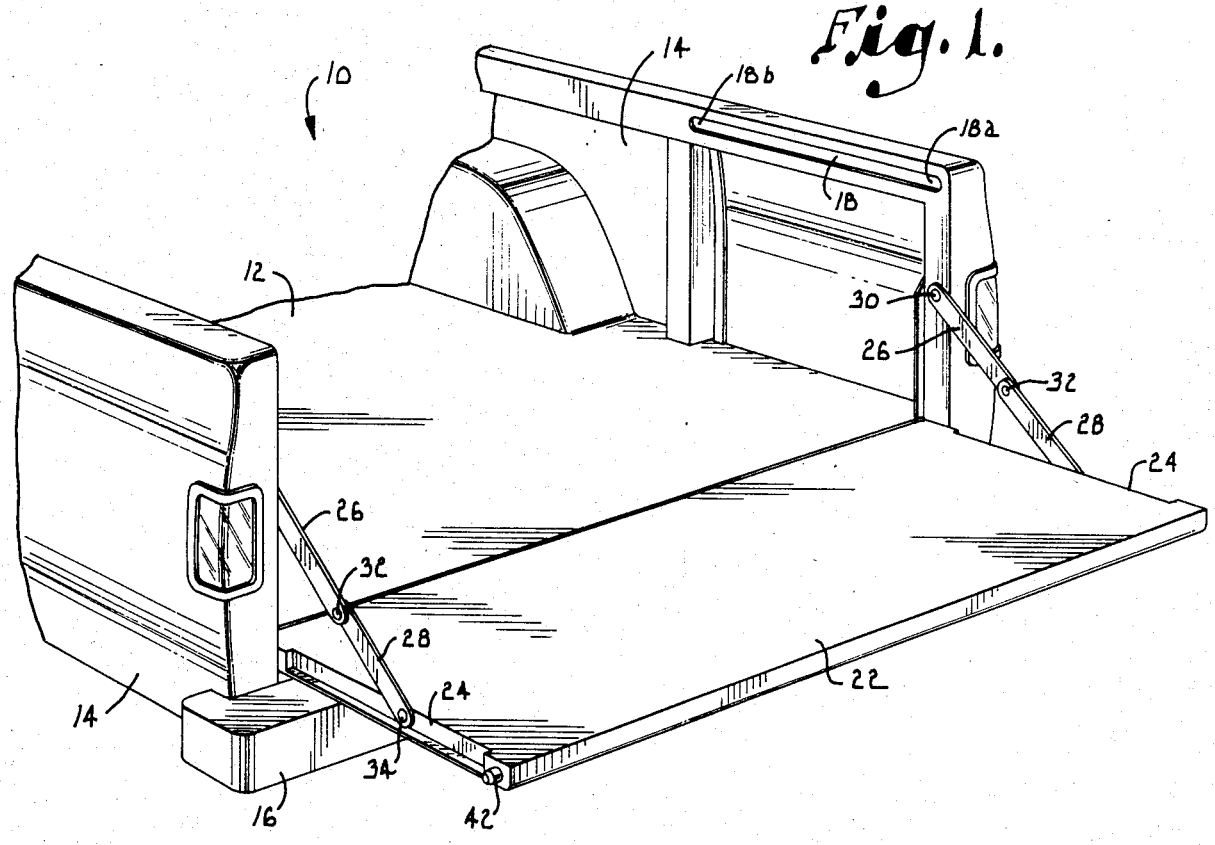
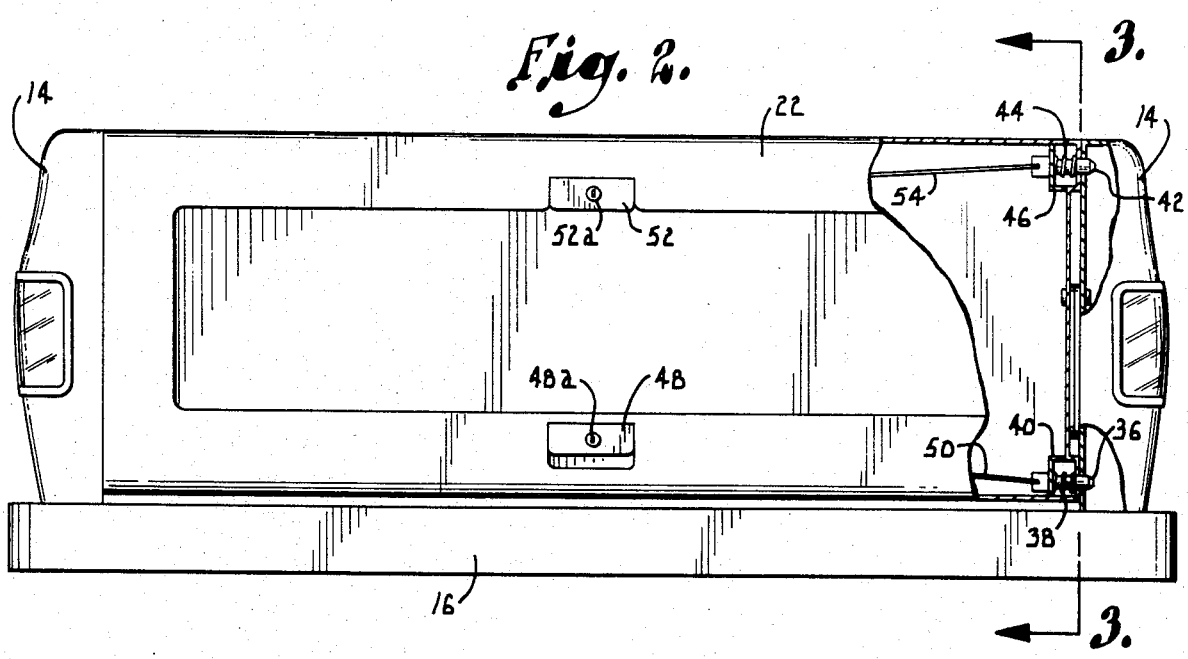

THREE POSITION TAILGATE

BACKGROUND OF THE INVENTION

This invention relates generally to tailgates and more particularly to a tailgate which can assume any of three different positions on the back end of a truck or other vehicle having an open cargo compartment.

The load beds of pickup trucks and similar vehicles having open cargo compartments are normally equipped with tailgates which can be opened and closed about a hinge axis. In the open position, the tailgate essentially forms an extension of the bed of the vehicle. When cargo is carried in the bed, the tailgate is normally closed and latched in the closed position to retain the cargo in the bed of the vehicle. The tailgate can usually be moved from the vehicle to permit the installation of a camper top.

When the tailgate is in the closed position, it assumes a vertical orientation and impedes the smooth flow of air through the bed area of the vehicle. The closed tailgate thus creates considerable air drag and turbulence which detracts significantly from the fuel economy of the vehicle. As a result, it is not uncommon for vehicle owners to drive either with the tailgate open or removed completely in order to reduce the air drag and increase the fuel economy. Both of these practices are hazardous.

When the vehicle is driven with the tailgate open, the tailgate extends to the rear beyond the rear bumper. Consequently, the rear bumper is unable to perform its normal function of receiving forces which are applied to the back end of the vehicle. Driving with the tailgate open creates such dangerous conditions that it is unlawful in some areas. In what would otherwise be minor rear end collisions, the open tailgate can cause undue damage and personal injury, and it can severely aggravate the damage and injury resulting from more serious accidents. Aside from safety considerations, the appearance of the vehicle suffers when it is driven with the tailgate open.

The practice of removing the tailgate completely in order to reduce air drag is equally undesirable. It detracts from the appearance of the vehicle and is inconvenient in that it requires the owner to manually remove and store the tailgate and to replace it when loads are to be hauled in the vehicle bed. This practice is also potentially dangerous because the temptation exists for the operator of the vehicle to perform hauling operations without replacing the tailgate. If this occurs, there is a strong possibility that the load may fall out of the cargo compartment and thereby create a serious safety problem.

SUMMARY OF THE INVENTION

The present invention provides an improved vehicle tailgate which, in addition to the conventional open and closed positions, has a third stabilizing position in which the tailgate presents little air drag or other interference with the air flow through the vehicle bed. In accordance with the invention, the tailgate is provided with a pair of retractable spring loaded pins on each end. The lower pins normally fit in hinge openings in the opposite sides of the vehicle to form a hinge axis about which the tailgate can be opened and closed in the usual fashion. When the tailgate is closed, it is latched by the fit of the upper pins in the back ends of slots which are formed in the sides of the vehicle bed above the hinge openings. The upper and lower sets of pins can be retracted independently by operating separate handles, which may be locked with a key.

In order to enhance the fuel economy of the vehicle without presenting safety problems, the tailgate has an elevated stabilizing position in which it extends between the sides in a horizontal orientation at an elevation well above the vehicle bed. The tailgate can be moved to its elevated position by retracting the lower set of pins, swinging the tailgate upwardly about the upper set of pins, and sliding the tailgate forwardly to position the upper pins in the front ends of the slots and the lower pins in the back ends of the slots. In the elevated position of the tailgate, air is able to flow freely and smoothly through the tailgate opening without encountering appreciable resistance. At the same time, the elevated tailgate gives the vehicle a unique attractive appearance, and it also facilitates unloading of sand, grain, dirt and other materials that are dumped or pushed out the back of the vehicle bed.

It is an important feature of the invention that standard handles and operating linkages can be used, as well as standard side brackets or cable support arrangements. Additional features of importance are the ease and speed with which the tailgate can be moved among its three positions and the ability of the tailgate to be installed as original equipment on new vehicles and as add on equipment on existing vehicles. Because of the increased fuel economy that is achieved in the elevated position of the tailgate, there is no need to operate the vehicle with the tailgate open or removed, and safer operation results.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary perspective view showing a pickup truck equipped with a tailgate constructed according to a preferred embodiment of the present invention, with the tailgate in the open position;

FIG. 2 is a rear elevational view of the vehicle, with the tailgate in the closed position and a portion broken away for purposes of illustration;

DETAILED DESCRIPTION OF THE INVENTION

Figure 3:
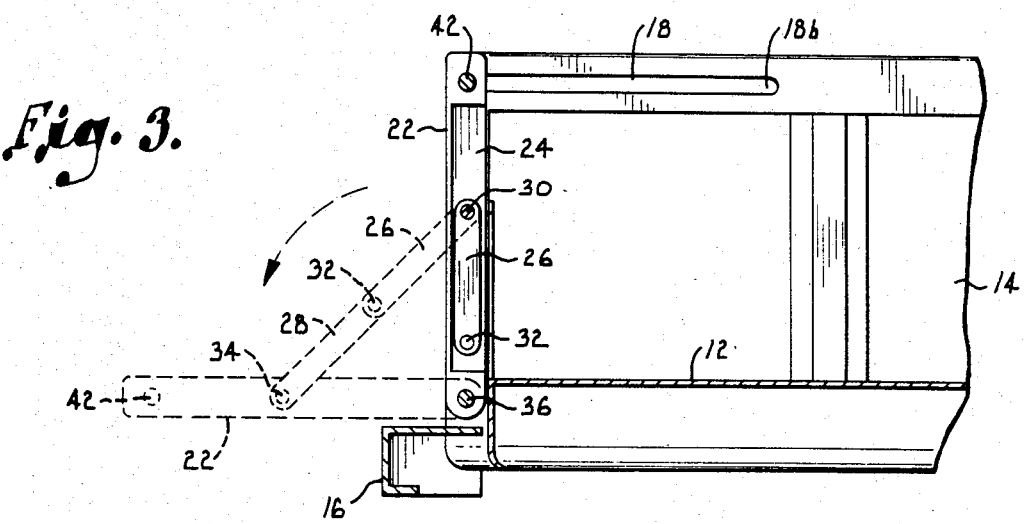
FIG. 3 is a fragmentary sectional view taken generally along line 3—3 of FIG. 2 in the direction of the arrows, with the broken lines showing the tailgate in the open position.

Referring now to the drawings in more detail and initially to FIG. 1, numeral 10 generally designates the open cargo compartment of a conventional pickup truck. The truck has a bed 12 which underlies the cargo compartment 10. Opposite sides 14 of the truck form opposite side walls of the cargo compartment. A rear bumper 16 extends between the back ends of the sides 14 at a location slightly below the bed 12.

Figure 4:
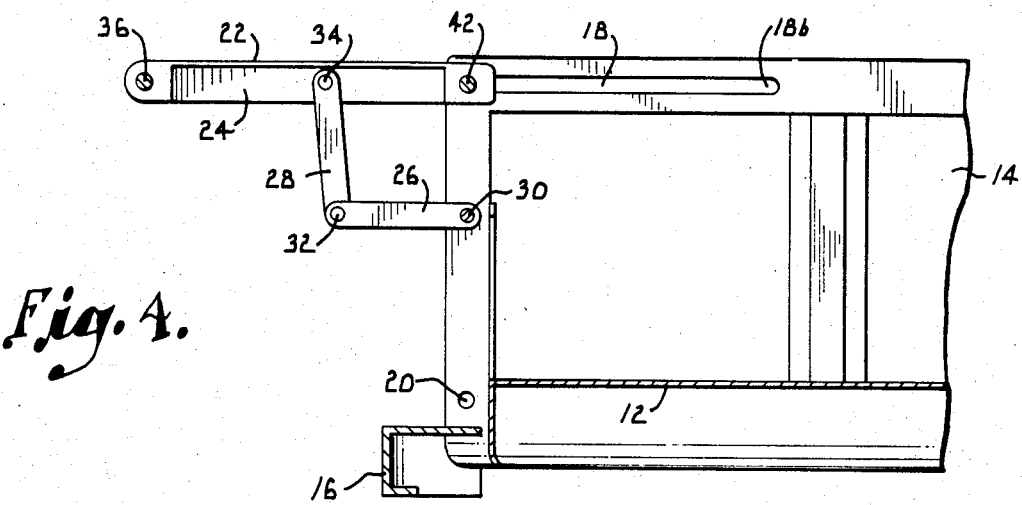
FIG. 4 is a fragmentary sectional view similar to FIG. 3, but showing the lower end of the tailgate raised in preparation for movement of the tailgate to its elevated stabilized position.
Figure 5:
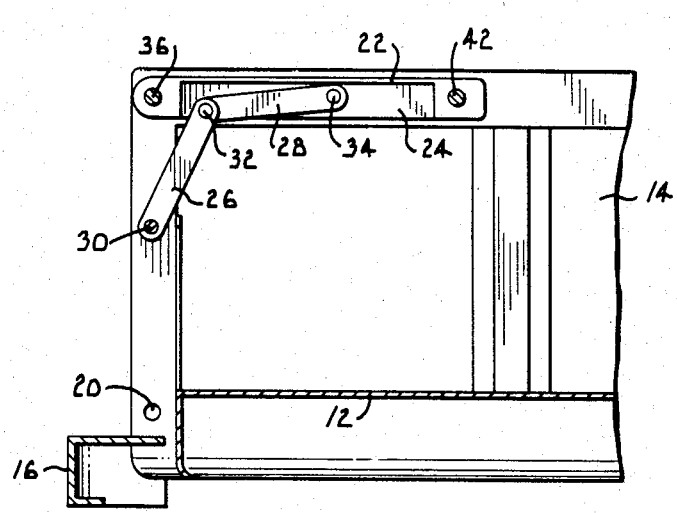
FIG. 5 is a fragmentary sectional view similar to FIGS. 3 and 4, but showing the tailgate in its elevated position.

In accordance with the present invention, a elongate horizontal slot 18 is formed in the inside surface of each side 14 near its upper edge. Each slot 18 has a back end 18a and a front end 18b. As best shown in FIGS. 4 and 5, a circular hinge opening 20 is formed in the inside surface of each side 14 at a location well below the back end 18a of the slot and slightly below the bed 12. The diameter of each opening 20 is equal to the width of each slot 18.

The tailgate of the present invention is generally designated by the numeral 22. The tailgate 22 has a length to extend between the opposite sides 14 of the vehicle. The tailgate has opposite ends which are recessed at 24 in order to acommodate folding brackets each formed by a pair of pivot arms 26 and 28. One end of each arm 26 is pivoted at 30 to the side 14 of the vehicle. The opposite end of each arm 26 is pivoted at 32 to one end of the other arm 28. The opposite ends of arms 28 are pivoted at 34 to the opposite ends of the tailgate 22 at locations within the recesses 24. The folding bracket supports are conventional, and the pivot couplings 30 can be detached from the vehicle sides 14 in order to permit the tailgate 22 to be completely removed from the vehicle.

Each end of tailgate 22 is provided with a lower pin 36. The pins 36 are axially extensible and retractable and are continuously urged in a direction to extend by compression springs, one of which is indicated at 38 in FIG. 2. Each spring 38 is contained within a small box 40 and engages the box at one end and an enlarged collar on pin 36 on the other end. The collars also retain pins 36 on the tailgate. Each pin 36 has a tapered tip and a diameter slightly smaller than that of the hinge opening 20 in order to fit closely therein. The pins 36 are aligned with one another and may be fitted in the hinge openings 20 to establish a horizontal hinge axis about which the tailgate 22 can be opened and closed on the back end of the vehicle. The lower pins 36 are located slightly below the recesses 24 on the opposite ends of the tailgate 22.

Each end of tailgate 22 is also provided with an upper pin 42. The upper pins 42 are identical in size and shape to the lower pins 36. Each upper pin is continuously urged in a direction to extend out of the tailgate 22 by a compression spring 44. Each spring 44 is contained in a box 46 and acts against the box at one end and against an enlarged collar on pin 42 at the other end. Pins 42 are axially aligned with one another and are located slightly above the recesses 24 in the opposite ends of the tailgate 22.

The two lower pins 36 can be retracted in unison against the force of springs 38 by operating a handle 48 (see FIG. 2). The handle 48 is located on the back panel of tailgate 22 near its bottom end. Handle 48 is connected with each of the lower pins 36 by a suitable mechanical linkage which includes a linkage rod 50 connected with the base end of each pin 36. The linkage between handle 48 and pins 36 is conventional. When the handle is pulled outwardly, the linkage rods 50 pull on pins 36 in order to retract the pins into the opposite ends of the tailgate 22. When the handle is released, the springs 38 return the pins 36 to their extended positions.

The upper pins 42 are similarly retractable in unison by operating an upper handle 52. Handle 52 is connected with each of the upper pins 42 by a mechanical linkage which includes a linkage rod 54. The rods 54 are connected with the base ends of the two upper pins 42. When the upper handle 52 is pulled outwardly, the linkage rods 54 retract the upper pins 42 against the force exerted by springs 44. When handle 52 is released, the springs 44 return pins 42 to the extended position.

Handles 48 and 52 are preferably provided with key operated locks having key holes 48a and 52a for receiving suitable keys. When the handles are locked, they cannot be pulled outwardly to retract the pins 36 and 42.

In use, the tailgate 22 can be installed on the back end of the vehicle by fitting the lower hinge pins 36 in the hinge openings 20. Pivot couplings 30 can be connected with the opposite sides 14 in order to connect the conventional folding brackets formed by arms 26 and 28. In this manner, the tailgate 22 is mounted on the vehicle for movement about the horizontal axis formed by pins 36 between the closed position shown in solid lines in FIG. 3 and the open position shown in broken lines in FIG. 3. In the open position (which is also shown in FIG. 1), the tailgate 22 forms a rearward extension of the vehicle bed 12 and is supported by the bracket arms 26 and 28. In this position, the tailgate extends rearwardly beyond the bumper 16.

When the tailgate 22 is moved to the closed position, the upper pins 42 fit in the back ends 18a of slots 18 in order to latch the tailgate closed. The distance between the back ends 18a of the slot and the hinge openings 20 is equal to the distance between the upper and lower pins 36 and 42 so that the latch arrangement is effective to maintain the tailgate in its closed position. The bracket arms 26 and 28 are then folded up within the recesses 24. The compression springs 38 and 44 act to maintain pins 36 and 42 in the latch openings 20 and slots 18, respectively. The tailgate can be moved to the open position only by operating the upper handle 52 in order to retract the upper pins 42. This withdraws pins 42 from slots 18 and releases the latch arrangement so that the tailgate can be swung downwardly to its horizontal open position about the hinge axis provided by pins 36.

In addition to the conventional open and closed positions previously described, tailgate 22 has a third position which is an elevated, stabilizing position. The elevated position is shown in FIG. 5, and the tailgate 22 then assumes a horizontal position at an elevation well above the bed 12.

The tailgate can be moved from the closed position to the elevated position by first operating the lower handle 48 in order to retract the lower pins 36. This withdraws the lower pins 36 from hinge openings 20 so that the tailgate can then be pivoted upwardly about the horizontal pivot axis provided by the upper pins 42. After the tailgate has been pivoted to the position shown in FIG. 4, it can be slid forwardly to the position shown in FIG. 5. Pins 42 slide along the length of slots 18 from the back ends 18a to the front ends 18b. When pins 42 have reached the front ends 18b of the slots, pins 36 are in registration with and can enter the back ends 18a of the slots. The fit of pins 36 and 42 in slots 18 supports and maintains tailgate 22 in the elevated position of FIG. 5. Again, the compression springs 38 and 44 assure that the pins remain extended into the slots unless they are intentionally retracted by operating the handles 48 and 52.

In its elevated position, the tailgate 22 assumes a horizontal orientation and is located well above the truck bed 12 in order to expose the tailgate opening so that air can flow smoothly and freely through the bed area and out the tailgate opening when the vehicle is in motion. Due to its horizontal orientation, the tailgate presents little wind resistance or air drag, and the fuel economy of the vehicle is increased accordingly. At the same time, the elevated tailgate provides the back end of the truck bed with a unique and striking appearance which makes the vehicle visually attractive.

It is important to recognize that the folding bracket arms 26 and 28, the handles 48 and 52, and the operating linkages which include linkage rods 50 and 54 can all be standard parts of the same type used on conventional tailgates. It is also important from a practical standpoint that the tailgate can be quickly and easily moved among its open, closed and elevated positions without requiring the exertion of undue force and while the tailgate remains attached to the vehicle in extension between its sides 14. The tailgate is simply pivoted between the open and closed positions, and it can be moved to the elevated position in the manner previously indicated. The tailgate can be returned from the elevated position to the closed position by operating handle 48 to retract pins 36, pulling the tailgate rearwardly until pins 42 are located in the back ends 18a of the slots, and then pivoting the tailgate downwardly until pins 36 are received in the hinge openings 20. All necessary movement of the tailgate is accommodated by the standard support brackets formed by the folding arms 26 and 28. If desired, conventional support cables can be used in place of the folding brackets.

It is contemplated that the tailgate will ordinarily be in the closed position when cargo is being carried in the cargo compartment 10 of the vehicle. When the cargo compartment is empty, the tailgate will normally be used in the elevated position because of the resulting fuel economy that can be achieved. In addition, many types of cargos can be safely carried with the tailgate in the elevated position. The vehicle bed can be unloaded with the tailgate in either the open position or in the elevated position. Materials such as gravel, sand, dirt, grain and the like which are unloaded by dumping or pushing out the back end of the vehicle bed can be removed more easily with the tailgate in the elevated position because it does not form an extension of the bed as occurs when the tailgate is in the open position.

It is thus apparent that the tailgate of the present invention can be used in either of the conventional open and closed positions and also in the elevated position in which improved fuel economy is achieved. There are no safety problems in the elevated position of the tailgate because it does not extend unduly beyond the back end of the vehicle and does not interfere with the normal function of the rear bumper 16. There is no need for specialized components, and little additional cost is encountered as compared to conventional tailgates. The tailgate of the present invention can be installed as original equipment on new vehicles and also as a replacement tailgate on used vehicles.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A tailgate construction for a vehicle having a bed and a tailgate opening presented between opposite vehicle sides having upper edges and lower edges adjacent the bed, said tailgate construction comprising:
   a tailgate having opposite ends and upper and lower edges and a length to extend between the sides of the vehicle;
   means for mounting said tailgate in extension between the sides for hinged movement about a generally horizontal hinge axis adjacent the lower edge of the tailgate between a closed position wherein the tailgate has a generally vertical orientation to close the tailgate opening and an open position wherein the tailgate has a generally horizontal orientation at an elevation to form a rearward extension of the bed;
   releasable means for latching said tailgate in the closed position thereof; and
   means for supporting said tailgate in extension between the sides of the vehicle adjacent the upper edges thereof at an elevated position wherein the tailgate has a generally horizontal orientation and is elevated above the bed with the lower edge of the tailgate located behind the upper edge thereof to permit air flow through the tailgate opening when the vehicle is moving, said tailgate being movable among the open, closed and elevated positions while remaining in extension between the sides.

2. The invention of claim 1, wherein said mounting means comprises:
   a hinge opening in each side of the vehicle;
   a hinge pin on each end of the tailgate supported thereon adjacent the lower edge of the tailgate for axial extension and retraction, said pins being extensible into said hinge openings to establish said generally horizontal hinge axis about which said tailgate can be swung between the open and closed positions;
   yieldable spring means acting to extend said hinge pins to maintain same in the hinge openings; and
   means for retracting said hinge pins in unison to effect withdrawal of the pins from the hinge openings.

3. The invention of claim 2, wherein said releasable latch means includes:
   a generally horizontal slot in each side of the vehicle, said slots being located above the hinge openings and having front and back ends;
   a second pin on each end of the tailgate supported thereon for axial extension and retraction, said second pins being extensible into the back ends of the slots to latch the tailgate against movement about said hinge axis;
   yieldable spring means acting on said second pins to urge same in a direction to extend; and
   means for effecting retraction of said second pins in unison to effect withdrawal of the second pins from the slots so that the tailgate can be moved to the open position about said hinge axis.

4. The invention of claim 3, wherein said slots and pins cooperate to provide said support means, said tailgate being pivotal about a generally horizontal axis defined by said second pins when said hinge pins are retracted out of the hinge openings and said second pins being movable in said slots from the back ends to the front ends thereof to permit the hinge pins to extend into the back ends of the slots, whereby the fit of said pins in the slots maintains the tailgate in its elevated position.

5. A tailgate construction for a vehicle having a bed and a tailgate opening at the back end of the bed presented between opposite sides each provided with a hinge opening and a generally horizontal slot located above the hinge opening, said tailgate construction comprising:

a tailgate having opposite ends and a length to extend between the sides of the vehicle, said tailgate having a closed position wherein the tailgate extends between the sides in a generally vertical orientation to close the tailgate opening, an open position wherein the tailgate extends between the sides in a generally horizontal orientation to form an extension of the bed, and an elevated position wherein the tailgate extends between the sides in a generally horizontal orientation at an elevation above the bed to expose the tailgate opening for air flow therethrough beneath the tailgate;

retractable pin means on each end of said tailgate for entry into the hinge openings to mount the tailgate for hinged movement between the open and closed positions about a generally horizontal hinge axis, said pin means entering the slots to support and maintain the tailgate in said elevated position when moved thereto and to latch the tailgate in said closed position when moved thereto; and operating means on said tailgate for selectively retracting said pin means to withdraw same from the latch openings and slots, thereby permitting the tailgate to be moved among the open, closed and elevated positions thereof.

6. The invention of claim 5, wherein said pin means includes:

a lower retractable pin on each end of said tailgate, said lower pins being aligned and entering the hinge openings to provide said hinge axis;

an upper retractable pin on each end of said tailgate, said upper pins entering said slots to latch said tailgate in the closed position when moved thereto and being retractable out of said slots to release the tailgate for movement to the open position; and said upper and lower pins being received in the slots in respective front and back ends thereof to maintain the tailgate in the elevated position thereof.

7. The invention of claim 6, including yieldable spring means acting to extend each of said upper and lower pins.

8. The invention of claim 7, wherein said operating means includes first and second means accessible on the tailgate for retracting the upper pins and lower pins, respectively.

9. The invention of claim 6, wherein said upper pins establish a generally horizontal pivot axis about which the tailgate can be pivoted when the lower pins are retracted out of the hinge openings, said upper pins being movable in the slots from the back ends thereof in the closed position of the tailgate to the front ends thereof in the elevated position of the tailgate.

10. A tailgate construction for a vehicle having a bed and opposite sides presenting therebetween a tailgate opening at the back end of the bed, said tailgate construction comprising:

a tailgate having opposite ends and retractable upper and lower pins on each end, said tailgate having a closed position wherein the tailgate closes the tailgate opening, an open position wherein the tailgate forms an extension of the bed, and an elevated position wherein the tailgate has a generally horizontal orientation at an elevation above the bed to expose the tailgate opening for airflow therethrough;

a hinge opening in each side of the vehicle, said openings being located to receive said lower pins in a manner to mount the tailgate for hinged movement between the open and closed positions about a generally horizontal hinge axis defined by the lower pins;

a generally horizontal slot in each side of the vehicle at a location above the hinge opening therein, said slots being located to receive said upper pins to releasably latch said tailgate in the closed position and to receive said upper and lower pins to maintain the tailgate in said elevated position when moved thereto; and operating means on said tailgate for effecting selective retraction of said upper pins and said lower pins to permit the tailgate to be selectively moving among the open, closed and elevated positions thereof.

11. The invention of claim 10, including yieldable spring means for urging each of said upper and lower pins toward extended positions thereof.

12. The invention of claim 11, wherein said operating means includes:

an upper handle on said tailgate;

linkage means for retracting said upper pins in unison from the extended positions thereof when said upper handle is operated;

a lower handle on said tailgate operable independently of said upper handle; and linkage means for retracting said lower pins in unison from the extended positions thereof when said lower handle is operated.

13. The invention of claim 10, wherein:

said upper pins are received in said slots in a manner to provide a generally horizontal pivot axis about which the tailgate can be swung when said lower pins are withdrawn from the hinge openings;

said upper pins are slidable in said slots between back ends thereof in the closed position of said tailgate and front ends thereof in the elevated position of said tailgate;

said lower pins are received in the back ends of the slots in the elevated position of the tailgate.

* * * * *